United States Patent
Hays et al.

(10) Patent No.: US 7,331,015 B2
(45) Date of Patent: Feb. 12, 2008

(54) DEFINING A REPORT BASED ON DATA REGIONS AND INCLUDING CUSTOM DATA IN A REPORT DEFINITION

(75) Inventors: Christopher Alan Hays, Monroe, WA (US); Fang Wang, Bellevue, WA (US); Jason Carlson, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 356 days.

(21) Appl. No.: 10/400,375

(22) Filed: Mar. 27, 2003

(65) Prior Publication Data

US 2004/0194015 A1    Sep. 30, 2004

(51) Int. Cl.
*G06F 17/21* (2006.01)
*G06F 17/24* (2006.01)

(52) U.S. Cl. .............. 715/522; 715/503; 715/517; 715/520; 707/3; 707/10; 707/102

(58) Field of Classification Search ............. 715/500, 715/503, 504, 517, 520, 539, 522; 707/1, 707/3, 10, 102
See application file for complete search history.

(56) References Cited

U.S. PATENT DOCUMENTS

| | | | | |
|---|---|---|---|---|
| 5,832,532 A | * | 11/1998 | Kennedy et al. | 715/503 |
| 5,937,155 A | * | 8/1999 | Kennedy et al. | 714/38 |
| 6,031,989 A | * | 2/2000 | Cordell | 717/109 |
| 6,088,708 A | * | 7/2000 | Burch et al. | 715/509 |
| 6,380,954 B1 | * | 4/2002 | Gunther | 715/764 |

OTHER PUBLICATIONS

XLReporter, Aug. 25, 2001, Sytech—The Experts in Automatic Report Generation and Data Analysis, pp. 1-8.*

* cited by examiner

*Primary Examiner*—Joshua D. Campbell
(74) *Attorney, Agent, or Firm*—Woodcock Washburn LLP

(57) ABSTRACT

A report definition is processed by a report processor to generate a report. The report definition includes a plurality of data regions arranged on a page, where the data regions as arranged on the page in the report definition extend in multiple dimensions selected from a group consisting of across the page, down page and layered on the page. The report processor has a data extension for accessing data for the report from a data source based on query information and data source information in the report definition. The report processor lays out the report in an intermediate format based on layout information in the report definition and the data accessed by the data extension. The report processor also has a rendering extension for rendering the report in a particular rendering format based on the intermediate format of the report.

22 Claims, 6 Drawing Sheets

DEFINING A REPORT BASED ON DATA REGIONS AND INCLUDING CUSTOM DATA IN A REPORT DEFINITION

CROSS-REFERENCE TO RELATED APPLICATION

The present application is related to U.S. patent application Ser. No. 10/400,734, filed Mar. 27, 2003 and entitled "DEFINING A REPORT BASED ON DATA REGIONS ANDINCLUDING CUSTOM DATA IN A REPORT DEFINITION".

TECHNICAL FIELD

The present invention relates to a system and method for designing and rendering a report of data based on defined data regions within the report. More particularly, the present invention relates to data regions within such a report that can be defined as extending in more than one dimension, and also to including custom data in a definition of a report.

BACKGROUND OF THE INVENTION

In any industry, enterprise, endeavor, or the like data regarding aspects thereof is accumulated over time for among other things the purpose of reporting status. For example, and with regard to a sales enterprise, sales data can be accumulated with regard to each sale of an item, including the salesman, the customer, the region of the salesman, the region of the customer, the amount of the sale, the quantity of the item sold, the date of the sale, the date of the delivery of the sold item, and/or the like. Based on such sales data, then, it may be that a report is generated that details sales by year, by month, by customer by year, by item by quarter, by salesman by delivery date, by region by week, and/or the like.

Most any report based on report data is generated based on a report definition. As may be appreciated, such report definition describes how to render the report on a page or screen or the like, and in particular describes how to lay out areas on the report such as a header, a footer, a group header, a group footer, a sub-group header, a sub-group footer, a table or other details based on report data, and/or the like. An example of an application for defining a report and rendering the report based on the definition is MICROSOFT ACCESS data organizing and reporting software as developed and marketed by MICROSOFT Corporation of Redmond, Wash., USA.

Significantly, in the prior art, data is organized within a defined report according to bands that extend between the sides of the page, screen, or the like (hereinafter "page"). Thus, a defined report as rendered on a page is a series of bands that extend in one dimension from the top of the page to the bottom thereof. Without anything more, then, elements of organized data within the report such as tables, charts, graphs, and the like are restricted to likewise extending in the one dimension from the top of the page to the bottom of the page. That is, and as an example, a table of data and a graph pictorially representing the table cannot be arranged side-by-side within a band.

In an effort to rectify the inability to define side-by-side elements within a band of a defined report, various artifices have been devised. In one artifice in particular, side-by-side elements are created within a band of a defined report by means of defining sub-reports for each element. However, defining and using such sub-reports is overly complex and cumbersome and still does not achieve more sophisticated goals such as layering elements on top of each other.

Accordingly, a need exists for a report definition and processing system and method that allows a report to be defined such that elements of organized data in the report can extend in more than one dimension, including down a page, across the page, and layered on the page. In particular, a need exists for a report definition and processing system and method that allows a report to be defined according to data regions that are to appear on the page, where the data regions are not bound to extending in any particular dimension. In addition, a need exists for a report definition and processing system and method that is extensible in that custom data can be set forth in a report definition and can be acted upon by an appropriate extension of the system.

SUMMARY OF THE INVENTION

The aforementioned needs are satisfied at least in part by the present invention in which a report definition is to be processed by a report processor to generate a report. The report definition includes a plurality of data regions arranged on a page, where the data regions as arranged on the page in the report definition extend in multiple dimensions selected from a group consisting of across the page, down page and layered on the page.

The report processor has a data extension for accessing data for the report from a data source based on query information and data source information in the report definition. The report processor lays out the report in an intermediate format based on layout information in the report definition and the data accessed by the data extension. The report processor also has a rendering extension for rendering the report in a particular rendering format based on the intermediate format of the report.

To generate the report from the report definition, data source information in the report definition is examined to determine each data source from which a data set must be obtained to generate the report, and query information in the report definition is examined to determine each query that is to be submitted to obtain a corresponding data set and a data source to which the query is to be submitted. For each data set to be obtained based on a query, a data extension is elected based on the data source for the query, the selected data extension is employed to submit the query to the data source, where the data source generates and returns the corresponding data set, and such data set is received. Thereafter, the report is laid out based on layout information in the report definition. A selection of a rendering format for the report is received, a rendering extension corresponding to the selected rendering format is itself selected, and the report is rendered with the selected rendering extension.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF THE INVENTION

Overview

In the present invention, a report is defined according to data regions that may be placed anywhere in three-dimensional space on a page. That is data regions may extend across a page, down a page, or be layered one on top of the other on a page. Thus, report layout is much more flexible than a prior art banded report with bands that extend down the page only. Each data region includes data from a particular data set organized into any of several types of elements including a graph, a table, a header, a footer, and/or the like. Each data region as set for the within a defined report has an X and Y position on the page and a Z (layering) order on the page, and also has a height and width.

Moreover, in the present invention, data from a data set may be represented/displayed in a defined report in multiple data regions thereof. Thus, and for example, data from a data set may be employed to construct a table and also to construct a chart representative of the table. Likewise, data from a data set may be represented in a first data region according to a first vector, such as by time, and in a second data region according to a second vector, such as by a geographic region.

Significantly, the use of data regions in a report definition eliminates the need to use sub-reports in most cases. Accordingly, problems inherent in sub-reports including increased complexity and cumbersomeness are avoided.

Computer Environment

Figure 1:
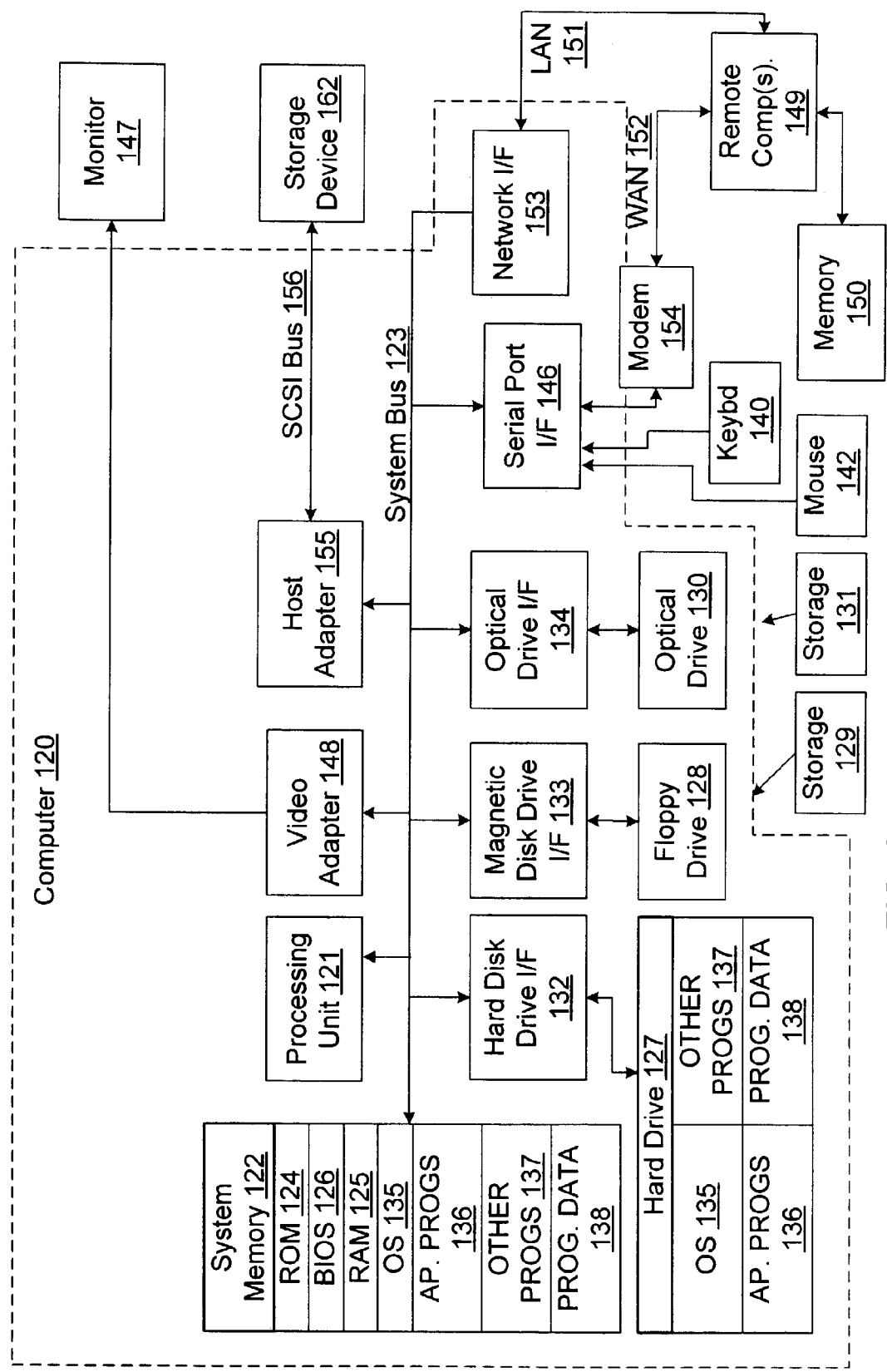
FIG. 1 is a block diagram representing a general purpose computer system in which aspects of the present invention and/or portions thereof may be incorporated.

FIG. 1 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, mini-computers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 20.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142. Other input devices (not shown) may include a microphone, joystick, game pad, satellite disk, scanner, or the like. These and other input devices are often connected to the processing unit 121 through a serial port interface 146.that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 1 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets, and the Internet. The personal computer 120 may also act as a host to a guest such as another personal computer 120, a more specialized device such as a portable player or portable data assistant, or the like, whereby the host downloads data to and/or uploads data from the guest, among other things.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Report Definition Based on Data Regions

Figure 2:
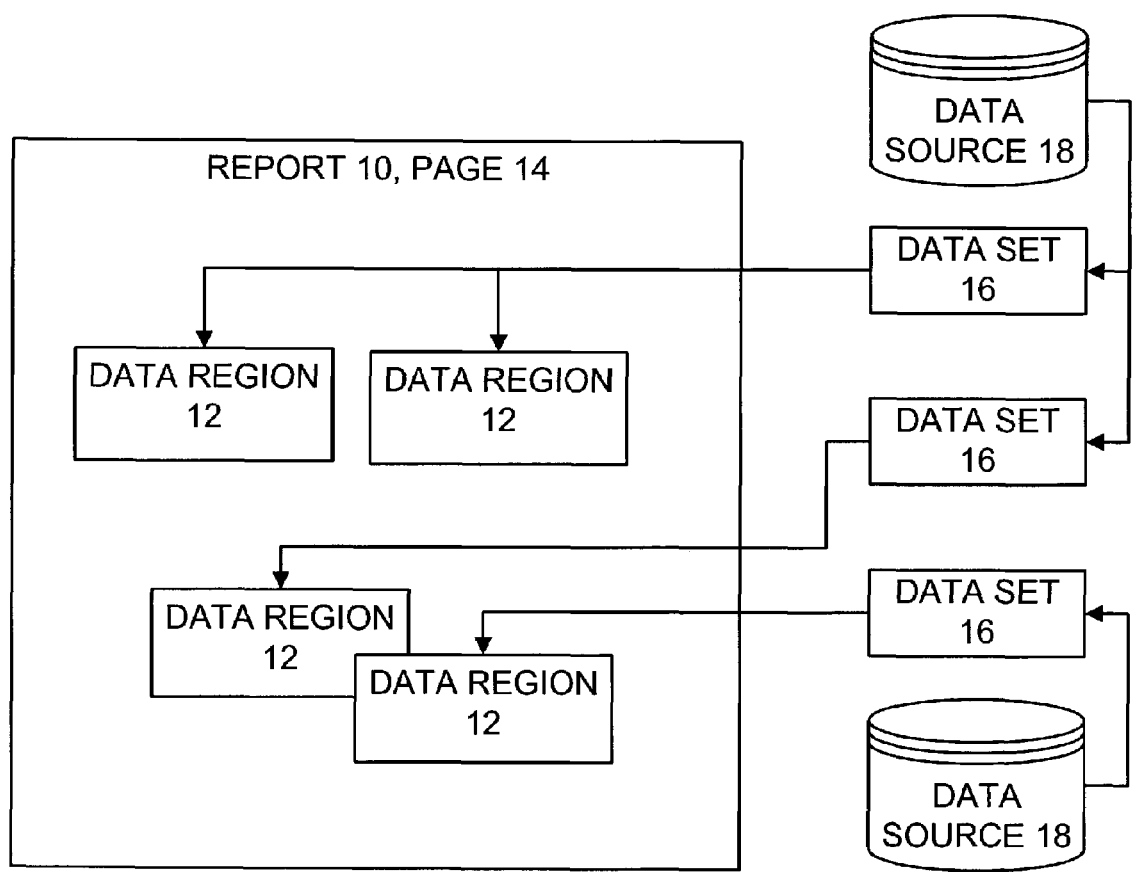
FIG. 2 is a block diagram showing a report laid out according to data regions that extend in multiple dimensions in accordance with one embodiment of the present invention.

In one embodiment of the present invention, and turning now to FIG. 2, it is seen that a report 10 is defined to have a plurality of data regions 12 arranged on a page 14. Significantly, each data region 12 as arranged on the page 14 in the defined report 10 may extend in any particular dimension, including across the page 14, down the page 14, on top of another data region 12, and the like.

Note that each data region 12 as defined in the report 10 of FIG. 2 derives from a particular data set 16, and that each data set 16 derives from a particular data source 18. A data set 16 may be associated many data regions 12 and a data source 18 may be associated with many data sets 16. It may be the case that some data regions 12 in a report 10 actually have no data from any data set 16 and therefore are merely regions. Nevertheless, such regions are still characterized as data regions 12 for purposes of convenience.

Figure 2A:
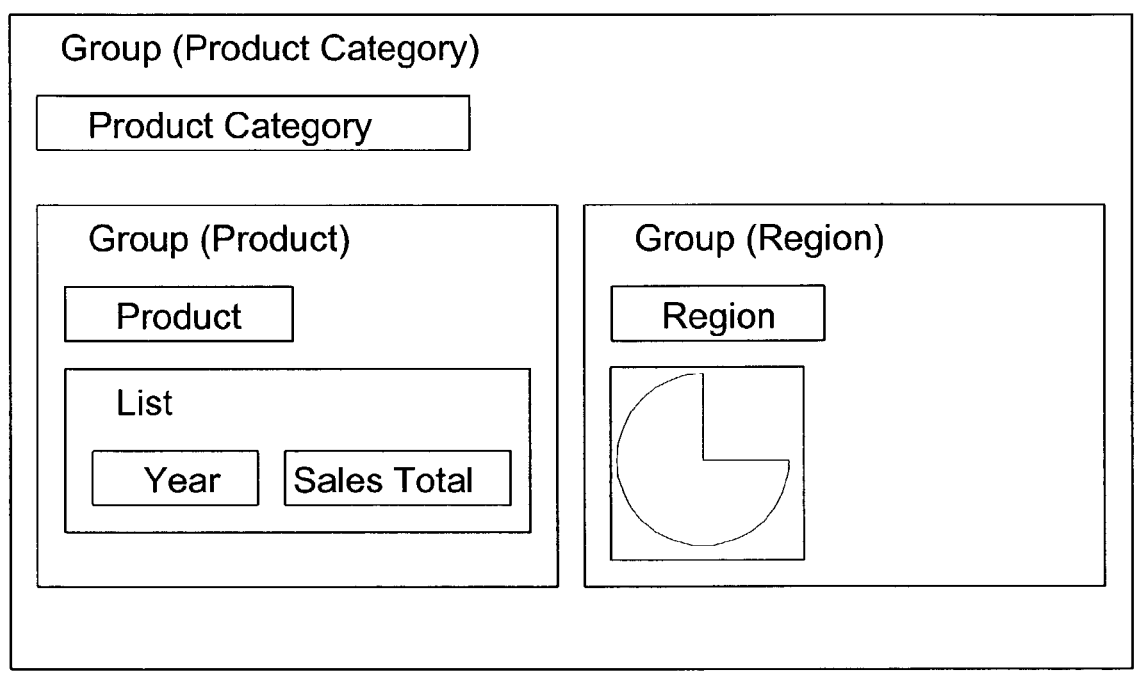
FIG. 2A is a block diagram showing an example of the report of FIG. 2

Turning now to FIG. 2A, a definition of a particular report 10 is shown. As may be appreciated, within the report 10 are one or more data regions 12, each representing a Product Category group. Thus, the Product Category group data region 12 is repeatable for however many products categories exist. Each Product Category group data region 12 represents a product category and has associated therewith a Product Category data region 12 with the name of the product category. As seen, the Product Category data region 12 is layered on top of the Product Category group data region 12. Thus, one data region 12 may be located in relation to another data region 12, and one data region 12 may derive from another data region 12 in a parent-child manner.

As may also be appreciated, within the report 10, for each Product Category group data region 12 there are one or more data regions 12, each representing a Product group data region 12. Thus, the Product group data region 12 is repeatable for however many products are in the product category. Each Product group data region 12 represents a product and has associated therewith a Product data region 12 with the name of the product. Each Product group data region 12 also has underneath the Product data region 12 a List data region 12 that lists sales totals for the product by year by way of one or more appropriate data regions 12. As seen, the Product data region 12 and List data region 12 are layered on top of the Product group data region 12, and the data regions 12 of the List data region 12 are layered on top of such List data region 12.

As may further be appreciated, within the report 10, for each Product Category group data region 12 there are one or more data regions 12, each representing a Region group data region 12. Thus, the Region group data region 12 is repeatable for however many regions are in the product category. Each Region group data region 12 represents a region and has associated therewith a Region data region 12 with the name of the region. Each Region group data region 12 also has underneath the Region data region 12 a Pie Chart data region 12 that displays a pie chart representative of the region. As seen, the Region data region 12 and Pie Chart data region 12 are layered on top of the Region group data region 12.

As may still further be appreciated, within the Product Category group data region 12, each Product group data region 12 is arranged to appear on the left side and each Region group data region 12 is arranged to appear on the right side. Thus, the report 10 as shown in FIG. 2A exhibits data regions extending down, assuming multiple repetitions of the group data definitions, extending across, as represented by the Product group and Region group data regions 12, and extending in a layered fashion.

Figure 3:
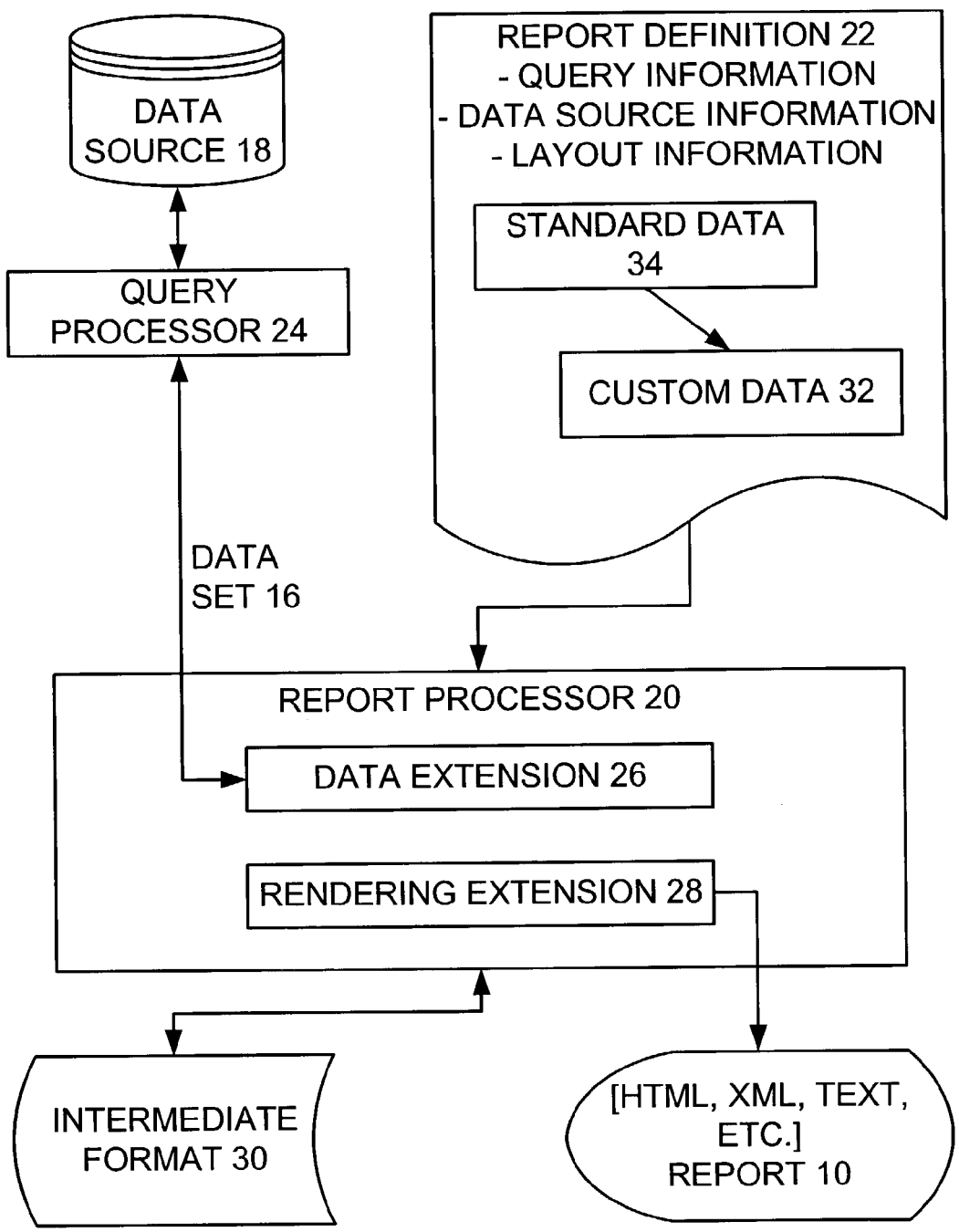
FIG. 3 is a block diagram showing a report processor and related elements for generating the report of FIGS. 2 and 2A in accordance with embodiments of the present invention.

In one embodiment of the present invention, and turning now to FIG. 3, a report 10 is generated by a report processor 20 from a report definition 22. As seen, the report definition 22 includes query information on the queries necessary to develop the data sets 16 that are to populate the data regions 12 with data, and data source information on each data source 18 from which the data sets 16 are to be obtained. The queries set forth in the query information may be based on any particular querying tool without departing from the spirit and scope of the present invention. The data source information includes all information necessary to locate and access each necessary data source 18. Such data source information may include a network location of the data source 18, as well as access parameters such as identifications, passwords, access protocols, and the like.

In one embodiment of the present invention, the report processor 20 does not itself access each necessary data source 18 and perform each query, but instead forwards appropriate portions of the query information and data source information to an appropriate query processor 24. As may be appreciated, based on such information, the query processor 24 accesses the data source 18, performs the query, and forwards the query results to the report processor 20 as the data sets 16.

As also seen in FIG. 3, the report definition 22 includes layout information on the layout of each data region 12 that is to appear in the report. Such layout information includes the size of each data region 14, where each data region 12 is to appear on a page 14, how each data region 12 relates to any other data region 12, and whether and if so how each data region 12 is layered on top of another data region 12. Significantly, the layout information in the report definition 22 also includes for each defined data region 12 an identification of the data set 16 from which the data for such data region is obtained, and information on how to populate the data region 12 with such data set 16.

A sample report definition 22 is set forth in Appendix A, attached. As seen, the report definition 22 is in an XML format, although other formats may also be employed without departing from the spirit and scope of the present invention. An appropriate report definition generating tool (not shown) may be employed to generate the report definition 22. Such generating tool is known or should be apparent to the relevant public based on the present disclosure, and may include appropriate user interface features to assist a user in constructing a report definition 22.

In one embodiment of the present invention, the report definition 22 with the query information, the data source information, and the layout information is executed by the report processor 20 to in fact generate the report 10. In doing so, the report processor 20 may employ one or more data extensions 26 to access the data by way of one or more query processors 24. Alternatively, the data extensions 26 may in fact be the query processors 24. Extensibility in the report processor 20 is achieved in that an additional data source 18 can be added at any time by providing an appropriate data extension 26.

In addition, the report processor 20 may employ one or more rendering extensions 28 to in fact render the report 10 in a particular format. For example, if a user selects that the report 10 is to be rendered in an HTML format, the report processor 20 would select an HTML rendering extension 28 to so render the report 10. Most any rendering extension 28 may be employed without departing from the spirit and scope of the present invention. For example, the rendering extension 28 may be an XML, bitmap, printer, TIFF, PostScript, PCL, PDF, or JPEG rendering extension, among others. Extensibility in the report processor 20 is also achieved in that an additional type of rendering can be added at any time by providing an appropriate rendering extension 28.

Figure 4:
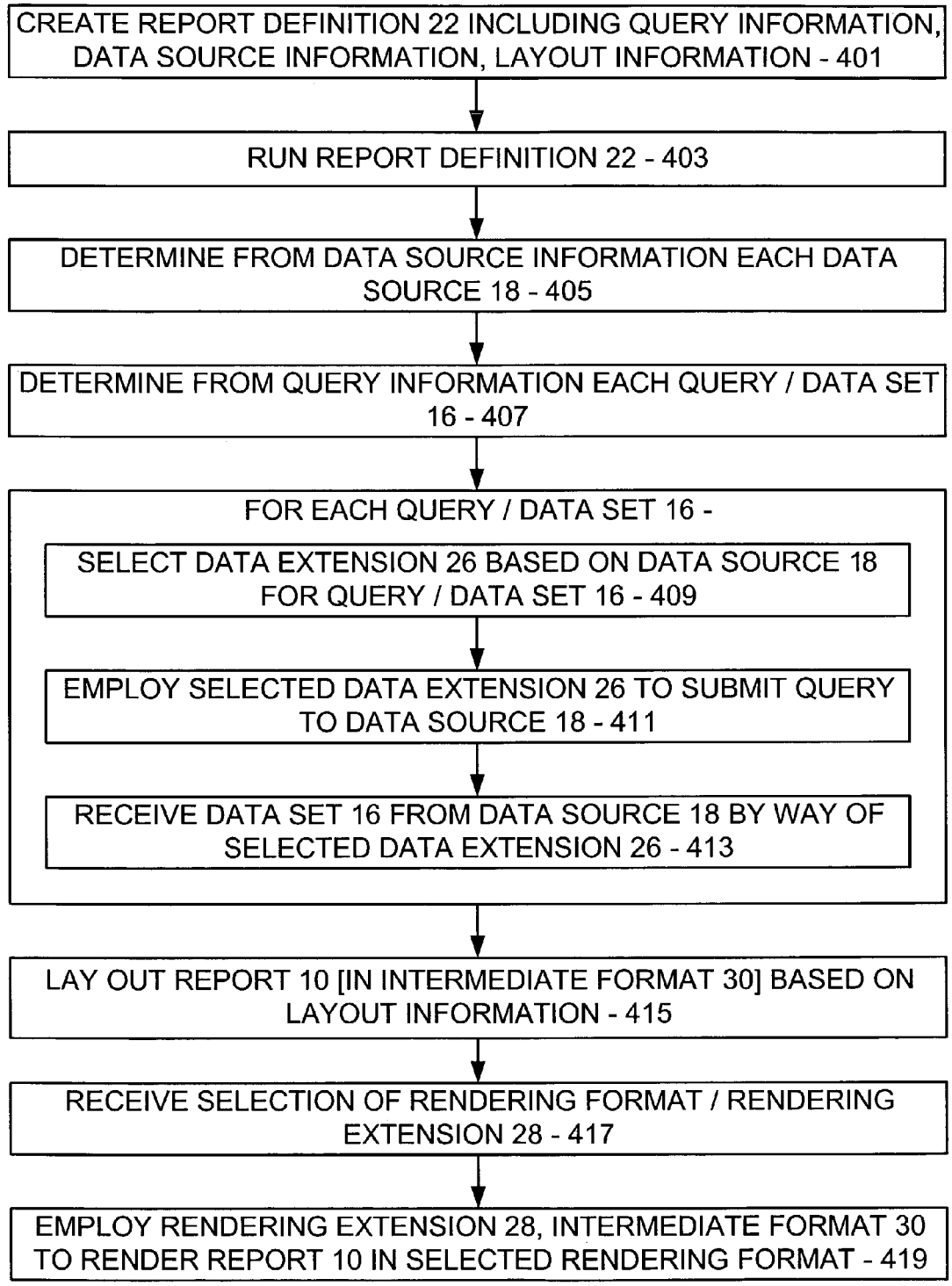
FIG. 4 is a flow chart showing key steps performed by the report processor of FIG. 3 in accordance with one embodiment of the present invention.

Referring now to FIG. 4, a process employed by the report processor 20 to generate a report 10 based on a report definition 22 is shown. Preliminarily, it is to be appreciated that a user creates the report definition 22 in an appropriate manner to define the report 10, and in doing so sets forth the query information, the data source information, and the layout information from which the report is to be generated (step 401). Thereafter, the same user or another user submits the created report definition 22 to the report processor 20 and such report processor 20 runs the report definition 22 (step 403).

In particular, the report processor 20 determines from the data source information in the report definition 22 each data source 18 from which a data set 16 must be obtained to generate the report 10 (step 405). In addition, the report processor 20 determines from the query information in the report definition 22 each query that is to be submitted to obtain a data set 16 and the data source 18 to which the query is submitted to (step 407).

For each data set 16 to be obtained based on a query, then, the report processor 20 selects a data extension 26 based on the data source 18 for the query (step 409) and employs the selected data extension 26 and all information necessary to access the data source 18 to submit the query to the data source 18 (step 411), perhaps by way of an appropriate query processor 24. The data source 18 in due course generates and returns the data set 16, and such data set 16 is received by the report processor 20 by way of the selected data extension 26 (step 413).

Once all data sets 16 needed for the report 10 have been received by the report processor 20, such report processor 20 then lays out the report 10 based on the layout information in the report definition 22 (step 415). In particular, based on each data region 12 defined in the report definition 22, the report processor lays out the data region 12 within the report 10 and populates the data region 12 with data from the data set 16 associated with such data region 12.

In one embodiment of the present invention, the laying out of the report 10 is performed independently of any rendering extension, and in fact the report 10 is laid out into an intermediate format 30. Thus, and as set forth in more detail below, rendering takes place afterward based on a selected rendering extension 28 and the intermediate format 30 of the laid out report 10. Of course, rendering may be performed immediately by a selected rendering extension without the use of an intermediate format 30 without departing from the spirit and scope of the present invention.

Once the report is laid out into the intermediate format 30, then, the report processor 20 in fact renders the report 10 based on a selected rendering extension 28. In particular, at some point, the report processor 20 receives a selection from the user regarding the type of rendering format/rendering extension 28 (step 417). Such selection may of course occur when the report 10 is run (step 403), after the report is laid out into the intermediate format 30 (step 415) or at any other appropriate or necessary time. In addition, the report definition 22 for the report 10 may specify the rendering extension 28 to be selected. With the selected rendering format, then, the report processor 20 employs the corresponding rendering extension 28 and the intermediate format 30 of the report 10 to render the report 10 in the selected format (step 419). The rendered report 10 is then available to be reviewed by the user if in a viewable format, printed by the user if in a printing format, or the like.

Custom Data in the Report Definition 22

As was set forth above, the report processor 20 is extensible in that additional data and rendering functionality may be provided by adding data and rendering extensions 26, 28, respectively. In one embodiment of the present invention, the report processor 20 is also extensible in that the report definition 22 submitted thereto may have custom data 32 that is not recognizable to the report processor 20 but is recognizable to, for example, a rendering extension 28 selected to render the report 10 based on the report definition 22. Accordingly, a report 10 may be imparted with custom rendering effects by defining custom data 32 for such effects in the report definition 22 for such report 10 (FIG. 3), and also by defining a rendering extension 28 that can interpret and act upon such custom data 32.

Custom data 32 can be any type of meta-data that adds to or modifies standard data 34 already recognized by the report processor 20 without departing from the spirit and scope of the present invention. Moreover, custom data 32 is not limited to data to be recognized by a rendering extension 28, but instead may be any data to be recognized by any extension. For example, if the standard data 34 is a text box data region 12, the custom data 32 could be to render the text box with embossed text or inverted colors. Similarly, if the standard data 34 is a digital picture in a picture data region 12, the custom data 32 could be to re-purpose the digital picture within a table data region 12. Likewise, if the standard data 34 related to security, the custom data 32 could be for a security extension (not shown) to calculate a security value in determining whether rendering should take place. As may be appreciated, types of custom data 32 abound, and accordingly any type of custom data may be employed without departing from the spirit and scope of the present invention.

Note, though, that inasmuch as the report processor 20 heretofore did not recognize the custom data 32 in the report definition 22, such report processor 20 deleted or ignored the custom data 32 in laying out the report in the intermediate format 30. In doing so, of course, the custom data 32 was not made available to the rendering extension 28 that is to render the report 10 based on the intermediate format 30 or to any other extensions.

Accordingly, and in one embodiment of the present invention, the custom data 32 within the report definition 22 is tagged as such, and the report processor 20 is programmed to recognize the tagged custom data 32 and pass same through to the intermediate format 30. Thus, in doing so, the passed-through custom data 32 is in fact made available to the rendering extension 28 that is to render the report 10 based on the intermediate format 30, or to any other extension, and the rendering extension 28 or other extension, which does recognize the passed-through custom data 32, can in fact interpret and act upon such custom data 32.

As was set forth above, a report definition 22 defines how to obtain data for data regions 12 of a report 10 and how to lay out the report 10 in an intermediate format 30 that is independent of the type of rendering to be applied to the report 10. In one embodiment of the present invention, and as seen in Appendix A, the report definition 22 is in a hierarchical format such as XML, and each piece of custom data 32 relates to standard data 34 by being represented within the report definition 22 as a sub-tree depending from a node representing the standard data 34. In addition, the sub-tree is tagged to the effect that such sub-tree represents custom data 32. Thus, the custom data 32 is associated with the standard data 34, and such association can be maintained when the custom data 32 is passed through to the intermediate format 30. In particular, in one embodiment of the present invention, the report processor 20 annotates appropriate parts of the intermediate format 30 with data derived from associated custom data 32.

Custom data 32 can be static or dynamic. As may be appreciated, static custom data 32 is data that the report processor 20 passes directly through to the intermediate format 30 without any manipulation. For example, such static custom data 32 may be a look-up table used by an extension to look up particular values in connection with the associated piece of standard data 34. In contrast, dynamic custom data 32 is data that the report processor 20 manipulates to produce a result, where the result is passes through to the intermediate format 30 if needed therein. For example, such dynamic custom data 32 may be values employed by the report processor 20 to calculate a contrast level, where the contrast level is passed through to the intermediate format 30. Note that the manipulations performed by the report processor 20 with regard to dynamic custom data 32 may or may not require data from a data set 16. Note also that the result of manipulations with regard to dynamic data 32 may be used by an extension other than the rendering extension 28, in which case the rendering extension 28 need not be aware of the result and such result need not be placed in the intermediate format 30.

Figure 5:
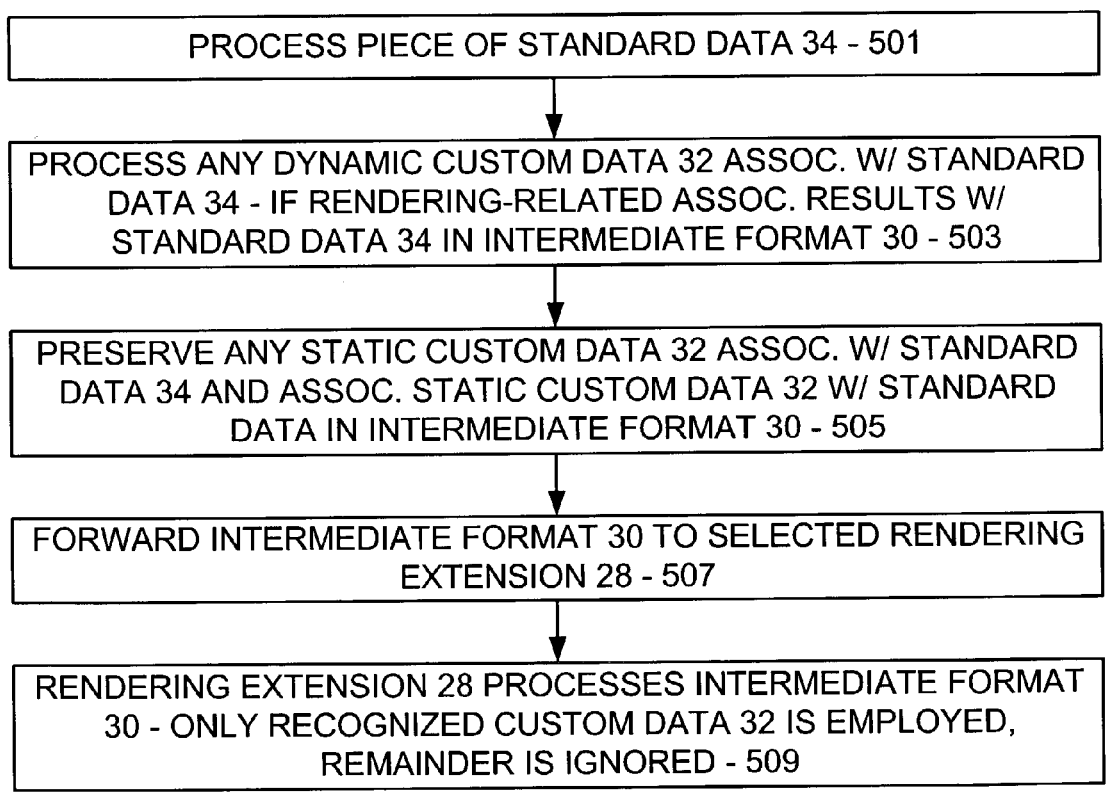
FIG. 5 is a flow chart showing key steps performed by the report processor of FIG. 3 in handling custom data in a report definition.

As may now be appreciated, each piece of custom data 32 within a report definition 22 is specific to one or more particular extensions and is related to a piece of standard data 34 in the report definition 22. Turning now to FIG. 5, when the report processor 20 processes a piece of standard data 34 (step 501), then, such processor 20 also: processes any dynamic custom data 32 associated therewith and if rendering-related associates the results with the standard data in the intermediate format 30 (step 503); and preserves any static custom data 32 associated therewith and associates such static custom data 32 therewith in the intermediate format 30 (step 505). The resulting intermediate format 30 with both data derived from standard data 34 and static custom data 32/data derived from dynamic custom data 32 is then forwarded to the selected rendering extension 28 for rendering and other related additional processing (step 507).

The rendering extension 28 processes the data derived from the standard data 34 to provide core system functionality and the data derived from the custom data 32 to provide extension-specific functionality. If data derived from more than one type of custom data 32 is present in the intermediate format 30, only that which is recognized by the rendering extension 28 is employed; the remainder is ignored (step 509). For example, a custom HTML rendering extension 28 could recognize a custom "frame" annotation on a standard intermediate format object such as a textbox and as a result render the contents of the textbox as HTML in a frame. A different rendering extension 28 that does not recognize the frame annotation would, however, simply render the textbox as a textbox.

Note that data derived from custom data 32 may be applicable to more than one rendering extension 28 without departing from the spirit and scope of the present invention. Thus, multiple extension-specific sets of custom data 32 can be present in the report definition 22, each controlling custom functionality in a respective extension component.

Conclusion

The programming necessary to effectuate the processes performed and data structures created in connection with the present invention is relatively straight-forward and should be apparent to the relevant programming public. Accordingly, such programming is not attached hereto. Any particular programming, then, may be employed to effectuate the present invention without departing from the spirit and scope thereof.

In the foregoing description, it can be seen that the present invention comprises a new and useful report definition and processing system and method that allows a report 10 to be defined such that elements of organized data in the report 10 can extend in more than one dimension, including down a page 14, across the page 14, and layered on the page 14. In addition, the system and method allow a report 10 to be defined according to data regions 12 that are to appear on the page 14, where the data regions 12 are not bound to extending in any particular dimension. Also, the system and method are extensible in that custom data 32 can be set forth in a report definition 22 and can be acted upon by an appropriate extension of the report processor 20.

It should be appreciated that changes could be made to the embodiments described above without departing from the inventive concepts thereof. It should be understood, therefore, that this invention is not limited to the particular embodiments disclosed, but it is intended to cover modifications within the spirit and scope of the present invention as defined by the appended claims.

APPENDIX A

Sample Report Definition 22

```xml
<?xml version="1.0"encoding="utf-8"?>
<Report
xmlns="http://schemas.microsoft.com/SQLServer/reporting/reportdefinition-2"
xmlns:rd="http://schemas.microsoft.com/SQLServer/reporting/reportdesigner">
   <DataSets>
      <DataSet Name="sales">
        <Fields>
           <Field Name="Category">
              <Alias>Category</Alias>
           </Field>
           <Field Name="Product">
              <Alias>Product</Alias>
           </Field>
           <Field Name="Year">
              <Alias>Year</Alias>
           </Field>
           <Field Name="Sales">
              <Alias>Sales</Alias>
           </Field>
           <Field Name="Region">
              <Alias>Region</Alias>
           </Field>
        </Fields>
        <Query>
           <DataSourceName>northwind</DataSourceName>
           <CommandType>Text</CommandType>
           <CommandText>SELECT    c.CategoryName AS Category, p.ProductName
AS Product, DATEPART(yyyy, o.OrderDate) AS Year, SUM(od.UnitPrice *
od.Quantity) AS Sales,
            r.RegionDescription AS Region
FROM      Territories AS t INNER JOIN
            Region AS r ON t.RegionID = r.RegionID INNER JOIN
            EmployeeTerritories AS et ON t.TerritoryID = et.TerritoryID INNER
JOIN
            Employees AS e ON et.EmployeeID = e.EmployeeID INNER JOIN
            Categories AS c INNER JOIN
            Products AS p ON c.CategoryID = p.CategoryID INNER JOIN
            [Order Details] AS od ON p.ProductID = od.ProductID INNER JOIN
            Orders AS o ON od.OrderID = o.OrderID ON e.EmployeeID =
o.EmployeeID
WHERE    (DATEPART(yyyy, o.OrderDate) >= 1997)
GROUP BY c.CategoryName, p.ProductName, DATEPART(yyyy, o.OrderDate),
r.RegionDescription</CommandText>
           <Timeout>30<Timeout>
        </Query>
      </DataSet>
      <DataSet Name="booksales">
        <Fields>
           <Field Name="Year">
              <Alias>Year</Alias>
           </Field>
           <Field Name="Sales">
              <Alias>Sales</Alias>
           </Field>
           <Field Name="Publisher">
              <Alias>Publisher</Alias>
           </Field>
        </Fields>
        <Query>
           <DataSourceName>pubs</DataSourceName>
           <CommandType>Text</CommandType>
           <CommandText>SELECT    DATEPART(yyyy, sales.ord_date) + 4 AS Year,
SUM(sales.qty * titles.price) AS Sales, publishers.pub_name AS Publisher
FROM      titles INNER JOIN
               sales ON titles.title_id = sales.title_id INNER JOIN
               publishers ON titles.pub_id = publishers.pub_id
WHERE    (DATEPART(yyyy, sales.ord_date) + 4 >= 1997)
GROUP BY DATEPART(yyyy, sales.ord_date) + 4,
publishers.pub_name</CommandText>
           <Timeout>30</Timeout>
        </Query>
      </DataSet>
   </DataSets>
   <Width>6.875in</Width>
   <DataSources>
      <DataSource Name="northwind">
        <ConnectionProperties>
```

APPENDIX A-continued

Sample Report Definition 22

```
        <Extension>SQL</Extension>
        <ConnectString>data source=rosedata;initial catalog=Northwind;integrated
security=SSPI;persist security info=False</ConnectString>
        <IntegratedSecurity>true</IntegratedSecurity>
      </ConnectionProperties>
    </DataSource>
    <DataSource Name="pubs">
      <ConnectionProperties>
        <Extension>SQL</Extension>
        <ConnectString>data source=rosedata;initial catalog=pubs;integrated
security=SSPI;persist security info=False</ConnectString>
        <IntegratedSecurity>true</IntegratedSecurity>
      </ConnectionProperties>
    </DataSource>
  </DataSources>
  <Body>
    <ReportItems>
      <Textbox Name="textbox13">
        <Height>0.25in</Height>
        <Width>1.875in</Width>
        <Top>0.125in</Top>
        <Value>Books</Value>
        <Left>0.375in</Left>
      </Textbox>
      <Table Name="table1">
        <ZIndex>1</ZIndex>
        <Height>0.5in</Height>
        <Width>6.5in</Width>
        <DataSetName>booksales</DataSetName>
        <TableColumns>
          <TableColumn>
            <Width>3.75in</Width>
          </TableColumn>
          <TableColumn>
            <Width>1.25in</Width>
          </TableColumn>
          <TableColumn>
            <Width>1.5in</Width>
          </TableColumn>
        </TableColumns>
        <Top>0.5in</Top>
        <Left>0.375in</Left>
        <Header>
          <HeaderRows>
            <HeaderRow>
              <Height>0.25in</Height>
              <TableCells>
                <TableCell>
                  <ReportItems>
                    <Textbox Name="textbox7">
                      <Height>0.25in</Height>
                      <Width>3.75in</Width>
                      <Top>0in</Top>
                      <Value>Publisher</Value>
                      <Left>0in</Left>
                    </Textbox>
                  <ReportItems>
                </TableCell>
                <TableCell>
                  <ReportItems>
                    <Textbox Name="textbox8">
                      <Height>0.25in</Height>
                      <Width>1.25in</Width>
                      <Top>0in</Top>
                      <Value>Year</Value>
                      <Left>0in</Left>
                    </Textbox>
                  <ReportItems>
                </TableCell>
                <TableCell>
                  <ReportItems>
                    <Textbox Name="textbox9">
                      <Height>0.25in</Height>
                      <Width>1.5in</Width>
                      <Top>0in</Top>
                      <Value>Sales</Value>
                      <Left>0in</Left>
```

APPENDIX A-continued

Sample Report Definition 22

```xml
            </Textbox>
          </ReportItems>
        </TableCell>
      </TableCells>
    </HeaderRow>
  </HeaderRows>
</Header>
<Details>
  <DetailsRows>
    <DetailsRow>
      <Height>0.25in</Height>
      <TableCells>
        <TableCell>
          <ReportItems>
            <Textbox Name="textbox10">
              <Height>0.25in</Height>
              <Width>3.75in</Width>
              <Top>0in</Top>
              <Value>=Fields!Publisher.Value</Value>
              <Left>0in</Left>
            </Textbox>
          </ReportItems>
        </TableCell>
        <TableCell>
          <ReportItems>
            <Textbox Name="textbox11">
              <Height>0.25in</Height>
              <Width>1.25in</Width>
              <Top>0in</Top>
              <Value>=Fields!Year.Value</Value>
              <Left>0in</Left>
            </Textbox>
          </ReportItems>
        </TableCell>
        <TableCell>
          <ReportItems>
            <Textbox Name="textbox12">
              <Height>0.25in</Height>
              <Width>1.5in</Width>
              <Top>0in</Top>
              <Value>=Fields!Sales.Value</Value>
              <Left>0in</Left>
            </Textbox>
          </ReportItems>
        </TableCell>
      </TableCells>
    </DetailsRow>
  </DetailsRows>
</Details>
</Table>
<List Name="Category_List">
  <ReportItems>
    <List Name="Product_List">
      <ZIndex>4</ZIndex>
      <ReportItems>
        <Textbox Name="textbox2">
          <Height>0.25in</Height>
          <Width>1.875in</Width>
          <Top>0in</Top>
          <Value>=Fields!Product.Value</Value>
          <Left>0in</Left>
        </Textbox>
        <Textbox Name="textbox4">
          <Height>0.25in</Height>
          <Width>0.875in</Width>
          <Top>0in</Top>
          <Value>=Sum(Fields!Sales.Value)</Value>
          <Left>1.875in</Left>
        </Textbox>
      </ReportItems>
      <Height>0.25in</Height>
      <Width>2.75in</Width>
      <DataSetName>sales</DataSetName>
      <Top>0.75in</Top>
      <Left>3.75in</Left>
      <Grouping Name="Product_List_Grouping">
        <GroupExpressions>
```

APPENDIX A-continued

Sample Report Definition 22

```
            <GroupExpression>=Fields!Product.Value</GroupExpression>
         </GroupExpressions>
      </Grouping>
   </List>
   <Textbox Name="textbox1">
      <Height>0.25in</Height>
      <Width>1.875in</Width>
      <Top>0.125in</Top>
      <Value>=Fields!Category.Value</Value>
      <Left>0in</Left>
   </Textbox>
   <List Name="year_list">
      <ReportItems>
         <Table Name="table2">
            <Height>0.5in</Height>
            <Width>3.375in</Width>
            <DataSetName>sales</DataSetName>
            <TableColumns>
               <TableColumn>
                  <Width>2.25in</Width>
               </TableColumn>
               <TableColumn>
                  <Width>1.125in</Width>
               </TableColumn>
            </TableColumns>
            <TableGroups>
               <TableGroup>
                  <Header>
                     <HeaderRows>
                        <HeaderRow>
                           <Height>0.25in</Height>
                           <TableCells>
                              <TableCell>
                                 <ReportItems>
                                    <Textbox Name="Region">
                                       <Height>0.25in</Height>
                                       <Width>2.25in</Width>
                                       <Top>0in</Top>
                                       <Value>=Fields!Region.Value</Value>
                                       <Left>0in</Left>
                                    </Textbox>
                                 </ReportItems>
                              </TableCell>
                              <TableCell>
                                 <ReportItems>
                                    <Textbox Name="Sales_1">
                                       <Height>0.25in</Height>
                                       <Width>1.125in</Width>
                                       <Top>0in</Top>
                                       <Value>=Sum(Fields!Sales.Value)</Value>
                                       <Left>0in</Left>
                                    </Textbox>
                                 </ReportItems>
                              </TableCell>
                           </TableCells>
                        </HeaderRow>
                     </HeaderRows>
                  </Header>
                  <Grouping Name="Region">
                     <GroupExpressions>
                        <GroupExpression>=Fields!Region.Value</GroupExpression>
                     </GroupExpressions>
                  </Grouping>
               </TableGroup>
            </TableGroups>
            <Top>0.375in</Top>
            <Left>0in</Left>
            <Header>
               <HeaderRows>
                  <HeaderRow>
                     <Height>0.25in</Height>
                     <TableCells>
                        <TableCell>
                           <ReportItems>
                              <Textbox Name="textbox14">
                                 <Height>0.25in</Height>
                                 <Width>2.25in</Width>
```

APPENDIX A-continued

Sample Report Definition 22

```
                        <Top>0in</Top>
                        <Value>Region</Value>
                        <Left>0in</Left>
                      </Textbox>
                    </ReportItems>
                  </TableCell>
                  <TableCell>
                    <ReportItems>
                      <Textbox Name="textbox15">
                        <Height>0.25in</Height>
                        <Width>1.125in</Width>
                        <Top>0in</Top>
                        <Value>Sales</Value>
                        <Left>0in</Left>
                      </Textbox>
                    </ReportItems>
                  </TableCell>
                </TableCells>
              </HeaderRow>
            </HeaderRows>
          </Header>
        </Table>
        <Textbox Name="textbox3">
          <Height>0.25in</Height>
          <Width>3.375in</Width>
          <Top>0in</Top>
          <Value>=CStr(Fields!Year.Value) + "Sales by Region"</Value>
          <Left>0in</Left>
        </Textbox>
      </ReportItems>
      <Height>1in</Height>
      <Width>3.375in</Width>
      <DataSetName>sales</DataSetName>
      <Top>0.5in</Top>
      <Left>0in</Left>
      <Grouping Name="year_list_Grouping">
        <GroupExpressions>
          <GroupExpression>=Fields!Year.Value</GroupExpression>
        </GroupExpressions>
      </Grouping>
    </List>
    <Textbox Name="textbox5">
      <Height>0.25in</Height>
      <Width>1.875in</Width>
      <Top>0.5in</Top>
      <Value>Product</Value>
      <Left>3.75in</Left>
    </Textbox>
    <Textbox Name="textbox6">
      <Height>0.25in</Height>
      <Width>0.875in</Width>
      <Top>0.5in</Top>
      <Value>Sales</Value>
      <Left>5.625in</Left>
    </Textbox>
  </ReportItems>
  <Height>1.5in</Height>
  <Width>6.5in</Width>
  <DataSetName>sales</DataSetName>
  <Top>1in</Top>
  <Left>0.375in</Left>
  <Grouping Name="Category_List_Grouping">
    <GroupExpressions>
      <GroupExpression>=Fields!Category.Value</GroupExpression>
    </GroupExpressions>
  </Grouping>
 </List>
 </ReportItems>
 <Height>2.5in</Height>
 </Body>
</Report>
```

The invention claimed is:

1. A report processor for executing a report definition to generate a report therefrom, the report processor comprising:
   a plurality of extensible data extensions stored in a memory, each data extension for being selected to access particular data for the report from a particular data source based on query information and data source information for the particular data in the report definition, the report processor laying out the report in an intermediate format based on layout information in the report definition and the data accessed by each data extension; and
   a plurality of extensible rendering extensions stored in the memory, each rendering extension for being selected by a user of the report processor to render the report in a particular rendering format based on the intermediate format of the report,
   the report definition including a plurality of data regions arranged on a page, each data region having a predefined position on the page, a predefined height in a direction from top to bottom on the page, and a predefined width in a direction from side to side on the page, each data region further having data organized into one of a plurality of data representations to visually present the data as a distinct grouping,
   wherein the plurality of data regions comprise a parent data region and at least one child data region,
   wherein each child data region derives from the parent data region and includes a subset of data included in the parent data region,
   wherein the report processor lays out the report in the intermediate format based on the parent data region and each child data region defined in the report definition and populates each data region with data therefor, and
   wherein, each time the report is laid out, the number of child data regions in the report automatically corresponds to the number of data subsets currently in the parent data region.

2. The report processor of claim 1 wherein the data extension accesses the data by sending a query to the data source and receiving the data in response.

3. The report processor of claim 2 wherein the data extension sends the query to the data source by way of a query processor that performs the query.

4. The report processor of claim 1 wherein the report definition includes for each data region an identification of a particular data set from which data for the data region is obtained, and wherein the data extension obtains each data set from a particular data source.

5. The report processor of claim 1, wherein the data regions as arranged on the page in the report definition extend in multiple dimensions including side-by-side across the page, top-and-bottom down the page, and layered on the page such that at least a portion of each layered data region appears on the page.

6. A method of generating a report from a report definition, the method comprising:
   determining from data source information in the report definition each data source from which a data set must be obtained to generate the report;
   determining from query information in the report definition each query that is to be submitted to obtain a corresponding data set and a data source to which the query is to be submitted;
   for each data set to be obtained based on a query:
      selecting a data extension based on the data source for the query from among a plurality of extensible data extensions, each data extension for being selected to access particular data for the report from a particular data source;
      employing the selected data extension to submit the query to the data source, the data source generating and returning the corresponding data set; and
      receiving such data set;
   laying out the report based on layout information in the report definition;
   receiving a selection of a rendering format for the report from a user;
   selecting a rendering extension corresponding to the selected rendering format from among a plurality of extensible rendering extensions, each rendering extension for being selected by a user of a report processor to render the report in a particular rendering format based on the intermediate format of the report; and
   rendering the report with the selected rendering extension to render the report in the selected rendering format,
   the report definition including a plurality of data regions arranged on a page, each data region having a predefined position on the page, a predefined height in a direction from top to bottom on the page, and a predefined width in a direction from side to side on the page, each data region further having data organized into one of a plurality of data representations to visually present the data as a distinct grouping,
   wherein the plurality of data regions comprise a parent data region and at least one child data region,
   wherein each child data region derives from the parent data region and includes a subset of data included in the parent data region, the method further comprising:
   laying out the parent data region and each child data region in the report in the intermediate format; and
   populating each laid out data region with data associated therewith,
   wherein, each time the report is laid out, the number of child data regions in the report automatically corresponds to the number of data subsets currently in the parent data region.

7. The method of claim 6, wherein the data regions as arranged on the page in the report definition extend in multiple dimensions including side-by-side across the page, top-and-bottom down the page, and layered on the page such that at least a portion of each layered data region appears on the page.

8. A computer-readable medium having stored thereon a data structure representing a report definition to be processed by a report processor to generate a report, the report definition including a plurality of data regions arranged on a page, each data region having a predefined position on the page, a predefined height in a direction from top to bottom on the page, and a predefined width in a direction from side to side on the page, each data region further having data organized into one of a plurality of data representations to visually present the data as a distinct grouping,
   wherein the plurality of data regions comprise a parent data region and at least one child data region,
   wherein each child data region derives from the parent data region and includes a subset of data included in the parent data region,
   the data structure including:
      query information on each query necessary to obtain a particular data set;

data source information on each particular data source from which a particular data set is to be obtained; and layout information for each data region specifying how to lay out the data region on the page, wherein the report processor lays out the parent data region and each child data region in the report and populates each data region with data associated therewith, and wherein, each time the report is laid out, the number of child data regions in the report automatically corresponds to the number of data subsets currently in the parent data region.

9. The computer-readable medium of claim 8 wherein the plurality of data regions are arranged to extend side-by-side across the page.

10. The computer-readable medium of claim 8 wherein the plurality of data regions are arranged to be layered one on top of another on the page.

11. The computer-readable medium of claim 8 wherein the report definition includes for each data region an identification of a particular data set from which data for the data region is obtained, each data set in turn being obtained from a particular data source.

12. The computer-readable medium of claim 8 wherein the layout information for each data region includes a size of the data region, where the data region is to appear on the page, how the data region relates to any other data region, and whether and if so how the data region is layered on top of another data region.

13. The computer-readable medium of claim 8 wherein the layout information for each data region includes the identification of the data set from which the data for such data region is obtained, and information on how to populate the data region with such data set.

14. The computer-readable medium of claim 8 wherein the data source information for each particular data source includes a network location of the data source and access parameters to access the data source.

15. The computer-readable medium of claim 8, wherein the data regions as arranged on the page in the report definition extend in multiple dimensions including side-by-side across the page, top-and-bottom down the page, and layered on the page such that at least a portion of each layered data region appears on the page.

16. A method for executing a report definition to generate a report therefrom, the method comprising:

accessing, by way of a data extension, data for the report from a data source based on query information and data source information in the report definition, the data extension being selected from among a plurality of extensible data extensions, each data extension for being selected to access particular data for the report from a particular data source;

laying out, by way of a report processor, the report in an intermediate format based on layout information in the report definition and the data accessed by the data extension; and rendering, by way of a rendering extension, the report in a particular rendering format based on the intermediate format of the report, the rendering extension being selected from among a plurality of extensible rendering extensions, each rendering extension for being selected by a user of the report processor to render the report in a particular rendering format based on the intermediate format of the report, the report definition including a plurality of data regions arranged on a page, each data region having a predefined position on the page, a predefined height in a direction from top to bottom on the page, and a predefined width in a direction from side to side on the page, each data region further having data organized into one of a plurality of data representations to visually present the data as a distinct grouping, wherein the plurality of data regions comprise a parent data region and at least one child data region, wherein each child data region derives from the parent data region and includes a subset of data included in the parent data region, wherein the report processor lays out the report in the intermediate format based on the parent data region and each child data region defined in the report definition and populates each data region with data therefor, and wherein, each time the report is laid out, the number of child data regions in the report automatically corresponds to the number of data subsets currently in the parent data region.

17. The method of claim 16 comprising the data extension accessing the data by sending a query to the data source and receiving the data in response.

18. The method of claim 17 comprising the data extension sending the query to the data source by way of a query processor that performs the query.

19. The method of claim 16 wherein the report definition includes for each data region an identification of a particular data set from which data for the data region is obtained, and wherein the data extension obtains each data set from a particular data source.

20. The method of claim 16, wherein the data regions as arranged on the page in the report definition extend in multiple dimensions including side-by-side across the page, top-and-bottom down the page, and layered on the page such that at least a portion of each layered data region appears on the page.

21. A computer-readable medium having stored thereon computer-executable instruction for performing a method of generating a report from a report definition, the method comprising:

determining from data source information in the report definition each data source from which a data set must be obtained to generate the report;

determining from query information in the report definition each query that is to be submitted to obtain a corresponding data set and a data source to which the query is to be submitted;

for each data set to be obtained based on a query:

selecting a data extension based on the data source for the query from among a plurality of extensible data extensions, each data extension for being selected to access particular data for the report from a particular data source;

employing the selected data extension to submit the query to the data source, the data source generating and returning the corresponding data set; and receiving such data set;

laying out the report based on layout information in the report definition;

receiving a selection of a rendering format for the report from a user;

selecting a rendering extension corresponding to the selected rendering format from among a plurality of extensible rendering extensions, each rendering extension for being selected by a user of a report processor to render the report in a particular rendering format based on the intermediate format of the report; and rendering the report with the selected rendering extension to render the report in the selected rendering format, the report definition including a plurality of data regions arranged on a page, each data region having a predefined position on the page, a predefined height in a direction from top to bottom on the page, and a predefined width in a direction from side to side on the page, each data region further having data organized into one of a plurality of data representations to visually present the data as a distinct grouping, wherein the plurality of data regions comprise a parent data region and at least one child data region, wherein each child data region derives from the parent data region and includes a subset of data included in the parent data region, the method further comprising:

laying out the parent data region and each child data region in the report in the intermediate format; and populating each laid out data region with data associated therewith, wherein, each time the report is laid out, the number of child data regions in the report automatically corresponds to the number of data subsets currently in the parent data region.

22. The computer-readable medium of claim 21, wherein the data regions as arranged on the page in the report definition extend in multiple dimensions including side-by-side across the page, top-and-bottom down the page, and layered on the page such that at least a portion of each layered data region appears on the page.

* * * * *

UNITED STATES PATENT AND TRADEMARK OFFICE
CERTIFICATE OF CORRECTION

| | | |
|---|---|---|
| PATENT NO. | : 7,331,015 B2 | Page 1 of 1 |
| APPLICATION NO. | : 10/400375 | |
| DATED | : February 12, 2008 | |
| INVENTOR(S) | : Christopher Alan Hays et al. | |

It is certified that error appears in the above-identified patent and that said Letters Patent is hereby corrected as shown below:

In column 1, line 11, delete "ANDINCLUDING" and insert -- AND INCLUDING --, therefor.

Signed and Sealed this
Twenty-second Day of February, 2011

David J. Kappos
*Director of the United States Patent and Trademark Office*